US010671059B2

(12) United States Patent
von Krauland

(10) Patent No.: US 10,671,059 B2
(45) Date of Patent: Jun. 2, 2020

(54) METHOD AND INSTALLATION FOR PRODUCING OBJECTS, AND TELECOMMUNICATION METHOD AND COMPUTER PROGRAM THEREFOR

(71) Applicant: Eisenmann SE, Boeblingen (DE)

(72) Inventor: Matthias von Krauland, Gstaad (CH)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 15/518,391

(22) PCT Filed: Oct. 12, 2015

(86) PCT No.: PCT/EP2015/002007
§ 371 (c)(1),
(2) Date: Apr. 11, 2017

(87) PCT Pub. No.: WO2016/058685
PCT Pub. Date: Apr. 21, 2016

(65) Prior Publication Data
US 2017/0315542 A1 Nov. 2, 2017

(30) Foreign Application Priority Data

Oct. 13, 2014 (EP) .................................... 14003501

(51) Int. Cl.
*G05B 19/418* (2006.01)
*G06Q 50/04* (2012.01)
*G06Q 10/06* (2012.01)

(52) U.S. Cl.
CPC ....... *G05B 19/41865* (2013.01); *G06Q 10/06* (2013.01); *G06Q 50/04* (2013.01);
(Continued)

(58) Field of Classification Search
CPC .... G05B 19/41865; G05B 2219/32035; G05B 2219/32036; G05B 2219/32037;
(Continued)

(56) References Cited

U.S. PATENT DOCUMENTS 5,212,791 A 5/1993 Damian et al.
6,654,726 B1 11/2003 Hanzek
(Continued)

FOREIGN PATENT DOCUMENTS

CA 2417145 A1 2/2002
CN 101 50 2079 A 8/2009
(Continued)

*Primary Examiner* — Yuhui R Pan
(74) *Attorney, Agent, or Firm* — Schroeder Intellectual Property Law Group, LLC

(57) ABSTRACT

The invention relates to a method for producing objects, in particular motor vehicles, in an industrial production process, wherein a plurality of work processes is coordinated by a process control system, wherein the process control system exchanges data with at least one electronic communication device via a communication path, which electronic communication device is operated autonomously and independently of the process control system, wherein a user can enter data at the electronic communication device, which are then transmitted to the process control system as a change data set, and the process control system coordinates the production process anew on the basis of the received change data. The invention further relates to an installation for producing objects, in particular motor vehicles, to a telecommunication method, and to a computer program.

5 Claims, 3 Drawing Sheets

(52) U.S. Cl.
CPC ........... *G05B 2219/32035* (2013.01); *G05B 2219/32036* (2013.01); *G05B 2219/32037* (2013.01); *Y02P 90/20* (2015.11); *Y02P 90/30* (2015.11)

(58) Field of Classification Search
CPC ........ G06Q 10/06; G06Q 50/04; Y02P 90/20; Y02P 90/30
See application file for complete search history.

(56) References Cited

U.S. PATENT DOCUMENTS

| | | | |
|---|---|---|---|
| 2002/0052862 A1* | 5/2002 | Scott | G06Q 10/06 |
| 2002/0120521 A1* | 8/2002 | Forth | G06Q 10/087 705/26.5 |
| 2003/0187753 A1* | 10/2003 | Takaoka | G06Q 10/087 705/26.4 |
| 2006/0010017 A1* | 1/2006 | Hase | G06Q 10/06 703/7 |
| 2008/0300710 A1* | 12/2008 | Cogswell | G06Q 10/06 700/105 |

FOREIGN PATENT DOCUMENTS

| | | |
|---|---|---|
| CN | 103 36 8949 A | 10/2013 |
| DE | 101 60 099 A1 | 4/2003 |
| DE | 102 58 655 A1 | 7/2003 |
| DE | 10 2006 019 627 A1 | 10/2007 |
| EP | 1 293 920 A1 | 3/2003 |
| EP | 1 355 249 A1 | 10/2003 |
| JP | 2001-117687 A | 4/2001 |
| WO | 2004/001633 A2 | 12/2003 |

* cited by examiner

METHOD AND INSTALLATION FOR PRODUCING OBJECTS, AND TELECOMMUNICATION METHOD AND COMPUTER PROGRAM THEREFOR

RELATED APPLICATIONS

This application is a national phase of International Patent Application No. PCT/EP2015/002007, filed Oct. 12, 2015, which claims the filing benefit of European Patent Application No. 14003501.5, filed Oct. 13, 2014, the contents of both of which are incorporated herein by reference.

FIELD OF THE INVENTION

The invention relates to a method for producing objects, particularly motor vehicles, in an industrial production process, in which a multiplicity of workflows are coordinated by a process control system.

Moreover, the invention relates to an installation for producing objects, particularly motor vehicles, having a process control system for an industrial production process for the objects.

Further, the invention relates to a telecommunication method for, in particular mobile, electronic communication devices that are connected to a work server via a wired or wireless network, and to a computer program.

BACKGROUND OF THE INVENTION

The invention is explained below merely by way of example using the example of the automotive industry and the production of motor vehicles; however, the statements made in this regard apply mutatis mutandis as appropriate to the production of any objects whose production involves a multiplicity of workflows being coordinated by a process control system.

The industrial production process for a motor vehicle is extremely complex and comprises both logistical and planning-oriented workflows as part of production planning, in which the required resources are ascertained, procured and distributed, and the technical workflows as part of production performance, in which a motor vehicle is actually manufactured.

During production performance, a multiplicity of production stages are passed through. In order to clarify the complexity of the production process for a motor vehicle, a few important stages are explained briefly below. Such important stages include, inter alia:

the foundry, in which cast parts, particularly the engine block, for example, are produced for the motor vehicle.

The press plant, in which the required sheet metal parts for the vehicle bodywork are manufactured.

Shell construction, in which the bodywork shell is formed from the sheet metal parts. Only shell construction is for its part divided into a multiplicity of substages in which individual subsections of the bodywork, such as the substructure, the doors or the like, are manufactured so as then to be assembled to form a vehicle bodywork.

The painting installation, in which the bodywork shell is provided with protection against corrosion and painted in multiple complex steps.

Chassis production, in which chassis-specific assemblies such as axles, cardan shafts, shock absorbers, brakes and the like are produced.

Interior fitting, in which all the components for the interior of the motor vehicle, such as paneling, roof lining, mats but also trim elements and operator control units, for example, are manufactured.

Exterior fitting, in which bumpers, exterior mirrors, trims and the like, for example, are produced.

Transmission manufacturing, where the vehicle-specific transmission is manufactured as required.

Engine manufacturing, where the engine for a particular motor vehicle is produced.

Vehicle assembly, in which the individual components and assemblies are finally assembled to produce the finished motor vehicle, which thereafter passes through yet another stage for quality control.

A process control system as cited at the outset is used to coordinate and monitor the complex production process for a motor vehicle at multiple system levels. A known variant of such a process control system is illustrated in FIG. 1, for example, in the form of a process control system 10. Known process control systems form an internal and self-contained system without a communication link to the outside.

This system comprises, as system levels, an ERP level 12, an MES level 14, a SCADA level 16 and a PLC level 18. Moreover, a manufacturing and production level 20 is illustrated that represents the process performance addressed above and is coordinated by the process control system 10 and is possibly part of the process control system 10.

The ERP level 12 forms the enterprise level, the task of which is, within the context of what is known as Enterprise Resource Planning, to plan and coordinate the procurement and distribution of resources that are required for perfect handling of the existing order.

The MES level 14, as works management level, forms what is known as the Manufacturing Execution System. This works management level communicates, inter alia, directly with the production level 20 and receives constant feedback therefrom about the ongoing process. The MES level 14 also uses and coordinates the available inventory at the same time and communicates with logistic centers and/or suppliers.

For the sake of completeness, FIG. 1 also shows the SCADA level 16 as the process management level and the PLC level 18 as the control level. SCADA stands for Supervisory Control And Data Acquisition; the SCADA level 16 forms a computer-based system for monitoring and controlling the technical processes that are performed during the production process. The PLC level 18 represents a programmable logic controller, which controls machines or installations in concrete terms.

The MES level 14, the SCADA level 16 and the PLC level 18 together form a process controller 22 for the manufacturing and production level 20.

The individual system levels communicate among one another and with one another, so that continuous interchange and collation of information about the planning status for a production line and a particular motor vehicle and the actual production status of the production line and the particular motor vehicle can take place.

The nowadays comprehensive equipment variants for motor vehicles mean that it has become established practice for motor vehicles no longer to be manufactured in advance and kept in stock in the sense of what is known as build to stock, but rather for individual motor vehicles to be manufactured according to the requirements of a customer order only after said order is received.

For the customers of motor vehicle manufacturers, the desire for individual equipment and configuration of the motor vehicle has increased steadily. Before a customer decides to buy a motor vehicle, he defines a multiplicity of configuration parameters for the motor vehicle.

The configuration parameters range from motorization with a choice of engine power and choice of transmission, i.e. petrol, diesel, electric or hybrid drive, through the type of tires, the color, the design of the upholstery, etc., as is known per se. Automobile manufacturers assist the customer in his decision for or against particular equipment features of the motor vehicle using configuration computer programs, what are known as configurators, which the customer can use to select different equipment variants and to compare them with one another. In so doing, the customer is also always provided with price information about the costs that are linked to a particular combination of equipment features.

If the customer decides to buy and has found his desired configuration for a motor vehicle, this is used to produce a customer order with a configuration data record that the process control system 10 then takes as a basis for integrating the ordered motor vehicle into the production process and coordinating the production process for this particular motor vehicle, and in so doing initiates the steps required for logistics and manufacture. In this case, the configuration data record reflects the configuration parameters selected and defined by the customer.

It has now been found that the multiplicity of configuration options mean that customers frequently have the desire to change the configuration of an ordered motor vehicle again even after the order has already been placed with the automobile manufacturer. As such, the color selected for the motor vehicle may no longer be perceived as appropriate for personal reasons, for example, or different motorization or another type of upholstery is desired after all.

A change of configuration can mean changing, erasing or adding configuration parameters. A change of a configuration parameter arises, for example, when, instead of the originally selected paint color red, the paint color white is chosen, or when an aluminum wheel rim is desired with a different design than that originally selected. If an external trim for the motor vehicle is no longer desired, for example, this means erasing a configuration parameter. Accordingly, a configuration parameter is added if the associated equipment feature had not yet been selected hitherto.

SUMMARY OF THE INVENTION

It is now an object of the present invention to provide a production method and an installation of the type cited at the outset that render the production process more transparent and more flexible for the customer, and to make supporting tools such as a telecommunication method and a computer program as cited at the outset available for this purpose.

This object may be achieved for a production method of the type cited at the outset in that the process control system uses a communication path to bidirectionally interchange data with at least one electronic communication device that is operated separately and independently from the process control system, wherein a user can input data on the electronic communication device that are then transmitted to the process control system as a change data record, and the process control system recoordinates the production process on the basis of the change data obtained.

This object is achieved for a production method of the type cited at the outset in that the process control system uses a communication path to bidirectionally interchange data with at least one electronic communication device that is operated separately and independently from the process control system, wherein a user can input data on the electronic communication device that are then transmitted to the process control system as a change data record, and the process control system recoordinates the production process on the basis of the change data obtained.

According to the invention, the process control system communicates bidirectionally with an electronic communication device. This may be any kind of electronic communication device, that is to say, by way of example, a desktop computer, a laptop or a notebook, a tablet computer or a smart phone and the like.

The communication device is operated separately and independently from the process control system. This means that the communication device can also operate without a connection and without being linked to the process control system, as is the case with the cited examples of electronic communication devices of a customer. The process control system per se is formed without this independent communication device, but for its part normally comprises electronic communication means for people working in the production process. However, these do not form separate communication devices of this kind that are of interest in the present case.

According to the invention, the customer is provided with the opportunity to change the previously selected configuration of a particular object, particularly a motor vehicle, during the already initiated and the ongoing production process and, as a result, to intervene in the ongoing production process. The latter is changed by the process control system on the basis of the received change data such that the result of production is matched to the most recently selected configuration.

The production process can comprise, by way of example, a multiplicity of workflows firmly defined in the ongoing production process and at least one configuration workflow that is used to implement at least one configuration parameter on the object, wherein the at least one configuration workflow can be modified, replaced, added or omitted until a PNR time associated with the at least one configuration parameter is reached when the configuration parameter changes before this PNR time is reached, wherein the configuration parameter defines a changeable selection configuration parameter before the PNR time is reached and, when the PNR time is reached, becomes an unalterable fixed configuration parameter.

A particular PNR time associated with a particular configuration parameter forms what is known as a "point of no return"; from this time onward, the course of the production process can no longer be changed in terms of the configuration parameter under consideration, which is why it then becomes a fixed configuration parameter. The respective PNR time for the available selection configuration parameters can be stipulated at the beginning of production, but is preferably monitored over the course of the whole production process in order to also be able to sense changes of a PNR time for a configuration parameter.

Firmly defined workflows are intended to be understood to mean such workflows as are not or no longer influenceable by the customer. By contrast, a configuration workflow is a workflow that is linked to a configuration parameter selected by the customer and can be selected and performed on the basis of said configuration parameter. In this case, a firmly defined workflow can also be integrated into a configuration workflow. By way of example, the type of vehicle door to be manufactured is dependent on the configuration parameter that determines the bodywork shape of the motor vehicle. Manufacture of this vehicle door is effected by a firmly defined workflow, however. The process of painting in a selected color by a painting robot is also a firmly defined workflow, for example. Selection of the color as a configuration parameter is in this case effected based on a configuration workflow into which this firmly defined painting process is integrated.

Depending on the production status and the progress of the course of production, the possible configuration parameters for configuring a motor vehicle form two groups. The first group defines selection configuration parameters that can still be changed by the customer, with changes made still being able to be taken into consideration in the production process. The second group is formed by fixed configuration parameters that can no longer be changed by the customer, since the ongoing production process no longer permits a change of these configuration parameters.

For the overall coordination by the process control system, it is then advantageous if
a) a production data record is generated that reflects at least one available selection configuration parameter;
b) the production data record is transmitted to the electronic communication device automatically or on request;
c) the production data record is reproduced and the at least one selection configuration parameter is changed by the user;
d) the change data record reflects changes of the at least one selection configuration parameter.

The production data record comprises the information that a selection configuration parameter is available that can still be changed. This information is displayed to the user, for example by being visually displayed. A change of selection configuration parameter can also involve said selection configuration parameter being defined by the user as a fixed configuration parameter and no longer being able to be changed in the further course of the production process.

It is particularly beneficial if the production data record reflects multiple, particularly all, available selection configuration parameters and at least one of the selection configuration parameters is changed by the user. In this case, the user and customer is provided with a comprehensive overview of those configuration parameters that can still be changed.

Preferably, the production data record moreover reflects the production status and/or available fixed configuration parameters. In this way, the user is provided with the direct information regarding how far the production of his motor vehicle has progressed and which equipment features can now no longer be changed.

If the production data record moreover reflects the PNR time for an available selection configuration parameter, then the user is advantageously given a time frame within which he can make the decision to change this configuration parameter.

It is particularly beneficial if the production data record moreover reflects information about selection options for an available selection configuration parameter. The selection options for a particular selection configuration parameter can vary in the course of the production process, for example, if materials or resources needed are absorbed by other processes. By way of example, a set of aluminum wheels with a particular design may be available as special equipment for a time, but no longer from a certain time onwards.

Preferably, at least one selection configuration parameter is an individual configuration parameter that the user can use to individualize the object.

In this case, individual patterns that allow a motor vehicle to be individualized for the end purchaser and user during the actual painting process are of interest, for example. Individual patterns of this kind may be e.g. photographs, images, texts, patterns and structures or the like that can be individually prescribed for the manufacturer by the end purchaser or end user and can be loaded via the electronic communication device and transmitted to the process control system.

Individual patterns of this kind can be put onto the inside of the vehicle bodywork as decorative patterns, for example. By way of example, it is possible for a photograph or image of a family member of the end purchaser to be printed in the interior of the vehicle bodywork as a decorative pattern. Alternatively, a vehicle bodywork can be provided with individual patterns on the outside as appropriate.

Another type of individual configuration parameter may be defined, for example, by the option of introducing the personal initials of the customer into the interior of the motor vehicle, for example in the form of embroidery on the upholstery.

The aforementioned object may be achieved for an installation of the type cited at the outset in that
the process control system cooperates with an interface by means of which data are bidirectionally interchangeable between the process control system and at least one electronic communication device that is operable separately and independently from the process control system.

The statements above apply to the separately and independently operable communication device. This allows performance of the production method explained above. The process control system 10 explained above merely by way of example may also be in a different form and, by way of example, merely comprise controllers that control and coordinate technical processes without logistical processes being included. This means that the process control system may also just be formed by an installation controller that is installed when the installation is constructed. If need be, such an installation controller comprises the SCADA level 16 and the PLC level 18. The ERP level 12 and the MES level 14 contribute to the installation when the installation is integrated into the enterprise and included and taken into consideration by the ERP level and the MES level of the enterprise.

In this case, it is beneficial if a work server connected to the interface is provided that is set up such that data are interchangeable between the work server and the at least one electronic communication device and the work server can receive a change data record for the process control system. This allows a communication platform to be formed between the electronic communication unit and the process control system, which makes sense for security reasons.

Preferably, the work server is operable separately and independently from the process control system. This allows the communication path to be partially decoupled from the process control system.

For security reasons, it is particularly preferred for the interface and the work server to have a data security device, preferably a firewall, provided between them.

The aforementioned object may be achieved for the telecommunication method in that
a) the work server receives a production data record that reflects at least one available selection configuration parameter, which is a configuration parameter that is implemented, during the production of an object, particularly a motor vehicle, in a configuration workflow on the object and can be changed until a PNR time associated with the at least one configuration parameter is reached;
b) the work server receives communication data associated with the production data record that define a communication partner to which the production data record is transmittable to an electronic communication device;
c) the work server transmits the production data record to the communication partner automatically or on request;
d) the work server receives a change data record from the communication partner that reflects a change made for the at least one selection configuration parameter;
e) the work server transmits the change data record to a process control system.

This telecommunication method allows a user, by receiving a production data record, to receive information about the state of production in terms of change options still available for configuration parameters and to be able to take this as a basis for transmitting change requests to the manufacturer.

The advantages of the features below correspond mutatis mutandis to the advantages that have been indicated above for the relevant features in the description of the production method:

it is accordingly beneficial if the production data record reflects multiple, particularly all, available selection configuration parameters and at least one of the selection configuration parameters is changeable by a user.

Advantageously, the production data record moreover reflects the production status and/or available fixed configuration parameters.

Preferably, the production data record moreover reflects the PNR time for an available selection configuration parameter.

It is particularly preferred for the production data record moreover to reflect information about selection options for an available selection configuration parameter.

If at least one selection configuration parameter is an individual configuration parameter that the user can use to individualize the object, then this takes particular account of the customer's desire for originality.

The aforementioned object may be achieved for a computer program in that it is configured such that, when executed on a computer, it prompts the computer to perform the following steps:
a) loading a production data record from a communication partner, wherein the production data record reflects at least one available selection configuration parameter, which is a configuration parameter that is implemented, during the production of an object, particularly a motor vehicle, in a configuration workflow on the object and can be changed until a PNR time associated with the at least one configuration parameter is reached;
b) reproducing information usable by a user on the basis of the production data record;
c) allowing a user to change one or more selection configuration parameters;
d) generating a change data record that reflects changes of one or more selection configuration parameters;
e) transmitting the change data record to the communication partner.

Reproduction of usable information is intended to be understood to mean a reproduction that can be read by the user and evaluated as a source of information for a decision. A suitable reproduction can be provided particularly by means of visual display of the information. In this context, depending on the type of information, a text representation, a graphical representation or an audio signal or combination of the two or of all types of representation may be suitable. By way of example, the approach of a PNR time for a selection configuration parameter can be displayed in the form of a clock running down and underscored by an audio signal from a particular time onward. Individual configuration parameters can be represented graphically, in particular.

It is advantageous for the user if the computer program takes the production data record as a basis for reproducing one or more of the following details as usable information:
a) one, multiple or all available selection configuration parameters;
b) the production status of the object;
c) one, multiple or all available fixed configuration parameters;
d) one, multiple or all PNR times for available selection configuration parameters;
e) given selection options for one, multiple or all available selection configuration parameters.

The information that the computer program can represent and ultimately also represents is dependent on the information content of the production data record that is loaded. It is naturally possible to reproduce only such information as can also be, derived from the production data record. For available fixed configuration parameters, it is also possible for the associated PNR time, the time of which has already been exceeded, to be communicated, for example.

It is particularly beneficial for the user if the computer is a mobile communication device and particularly a smart phone or a tablet computer.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention will now be explained in more detail below with reference to the drawings, in which.

DETAILED DESCRIPTION OF THE PRESENT INVENTION

Figure 1:
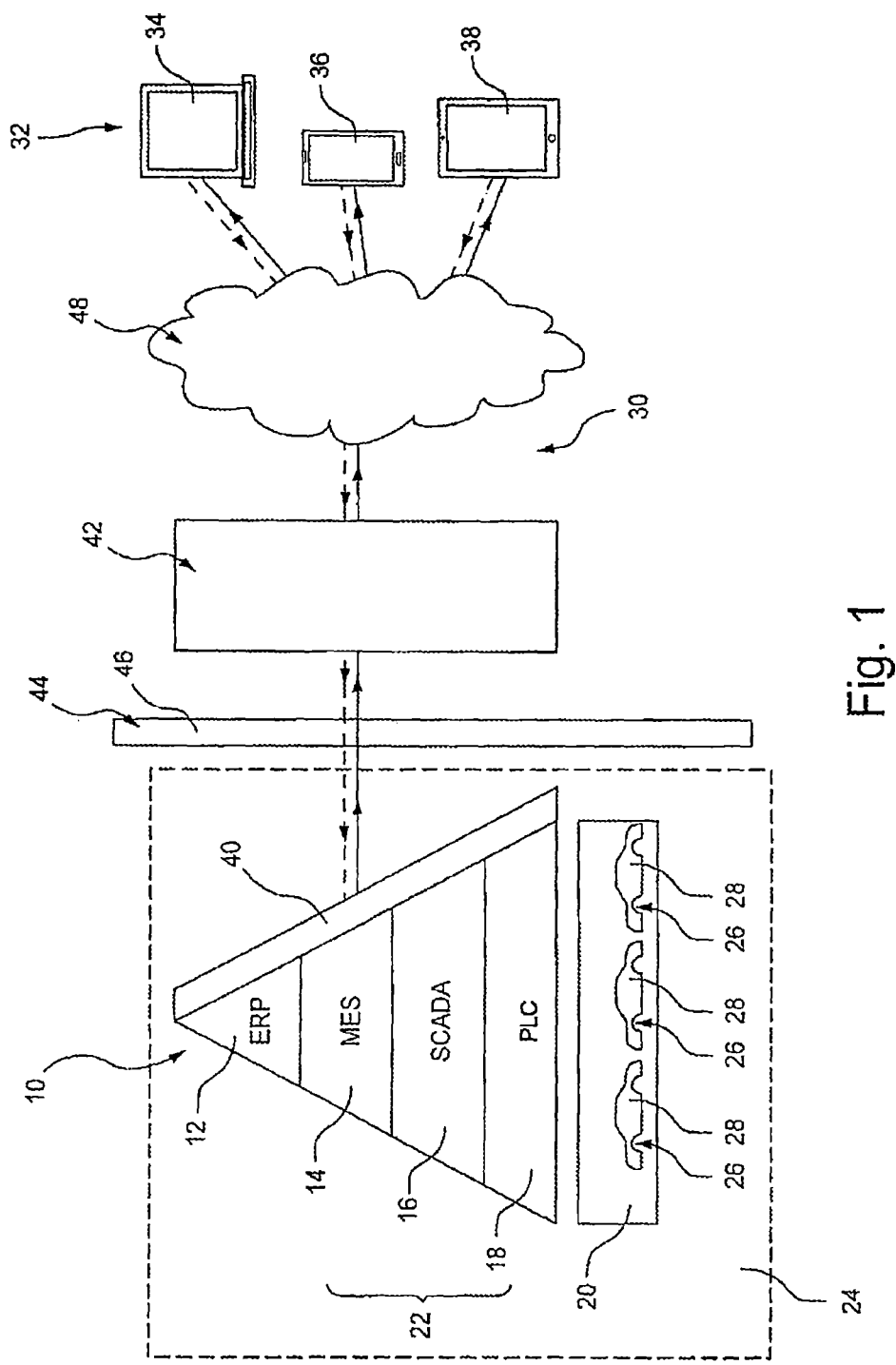
FIG. 1 schematically shows a design of a communication infrastructure for communication between a process control system for an industrial production process and electronic communication devices.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

First of all, reference is once again made to FIG. 1. This shows the already explained production control system 10 and the manufacturing and production level 20 as part of an installation 24, indicated only in dashes, for producing objects 26, which are illustrated as motor vehicles 28 within the manufacturing and production level 20.

The manufacturing and production level 20 is an exemplary representation of all workflows that need to be performed for producing a motor vehicle 28 and that are coordinated by the process control system 10.

The process control system 10 uses a bidirectional communication path 30 to interchange data with electronic communication devices 32, communication channels in the direction of the communication devices 32 being illustrated by means of a solid line and associated arrows and communication channels in the direction of the process controller 10 being illustrated by means of dashed lines and associated arrows. The communication devices 32 are operated separately and independently from the process control system 10, as explained above.

FIG. 1 shows, highly schematically and as an example of such communication devices 32, a desktop computer 34, a smart phone 36 and a tablet computer 38, which is subsequently referred to only as a tablet 38 for the sake of simplicity. All electronic communication devices 32 form computers with the capability of storing, processing and performing data and programs. The smart phone 36 and the tablet 38 represent mobile electronic communication devices 32 by way of example.

The communication path 30 comprises an interface 40 that cooperates with the process control system 10. The interface 40 for its part communicates with a work server 42, which is usually used as a mediator between two communicating electronic units. The work server 42 therefore defines a communication partner for the electronic communication units 32 and for the process control system 10. In practice, the communication with the interface 40 is effected at the MES level 14. Alternatively or additionally, the communication can also be effected from the ERP level 12. In principle, any level 12 to 18 and also the manufacturing and production level 20 can communicate via the interface 40. Preferably, however, the customer is not meant to be permitted to influence the production level 20 directly, but rather is meant to be permitted to influence it only indirectly via the configuration parameters and the communication with one or more of the levels 12 to 18. As such, the process control system 10 can still perform a final check to ascertain whether the configuration requirement can actually be met, for example.

It may be desirable for the communication by the customer to take place not with the manufacturer directly but rather with a dealer. In this case, in a variation that is not shown specifically, the process control system 10 can also first of all communicate with this dealer, which for its part forwards data to the work server 42 and in this way to the customer and the electronic communication device 32 thereof.

The interface 40 and the work server 42 have a data security device 44 set up between them in the form of a firewall 46, through which at least the data that are transmitted from the work server 42 to the interface 40 must pass.

The work server 42 is connected to the electronic communication devices 32 via a network 48. The connection between network 48 and the electronic communication devices 32 can be provided in wired or wireless form. Particularly in the case of mobile communication devices 32, the connection will be provided in wireless form in a manner known per se.

The communication between the communication partners takes place likewise in the manner known per se using established transport protocols such as TCP, HTTP, HTTPS or the like. The computer program explained above may be installed as such on an electronic communication device 32. The work server 42 may alternatively have a web server set up on it, for example, which serves as a user interface for the user, so that in this case the computer on which the computer program explained above runs is the work server 42. The production data record is then not transmitted as such to the electronic communication device 32, but rather communication takes place in completely browser-based fashion. The communication partner for the work server 42, from which the latter receives the production data records, is then the interface 40 or, in the broader sense, the process control system 10. In such a case, the communication device 32 serves as a display and input device. In this case, the work server 42 does not transmit the production data record to the communication device 32, but rather only information based on said production data record.

It is subsequently assumed by way of example that the process control system 10 communicates with the tablet 38. For the latter, the manufacturer of the motor vehicle or a dealer provides the user with a computer program in the form of what is known as an App that the user can use to communicate with the work server 42, which therefore serves as a communication platform. In this context, the term App is intended to be understood to mean all types of computer programs, regardless of the programming language used.

Figure 2:
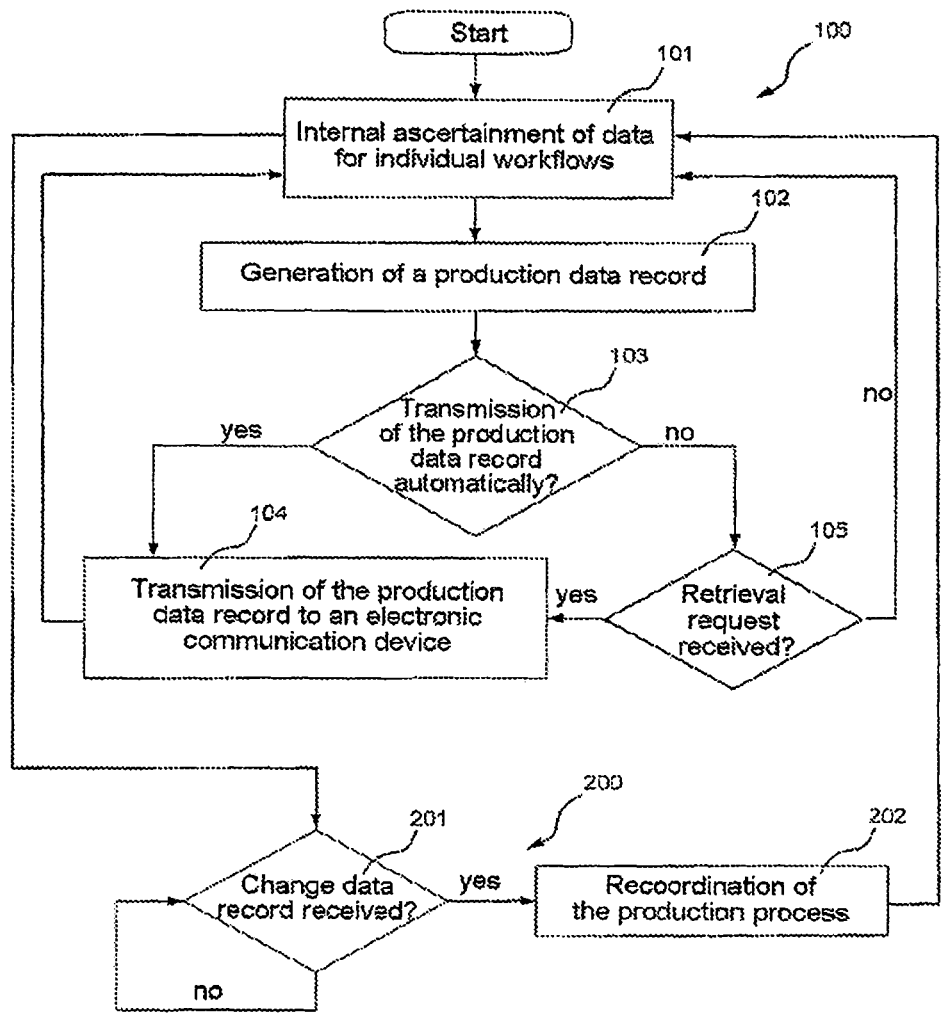
FIG. 2 shows a flowchart that illustrates the essential aspects of the data and communication processing of the process control system.

FIG. 2 now uses an exemplary embodiment to illustrate the essential aspects of the communication and data processing of the process control system 10 in view of the data interchange with a work server 42. In this case, it is presupposed that an order for the production of a motor vehicle 28 has already been placed, for which a configuration data record that reflects the configuration parameters selected by the customer has been transmitted to the manufacturer. It goes without saying that the communication and data processing also include further tests and/or implementation steps that are not shown specifically.

The process control system 10 executes a process 100 in which the process control system 10, particularly using the MES level 14, ascertains data pertaining to the individual workflows internally in a step 101 and correlates said data to a production data record in a step 102. This also involves the PNR times for individual configuration parameters being determined.

The production data record contains information about the status of the production and information regarding whether individual configuration parameters are still selection configuration parameters or are already fixed configuration parameters. Furthermore, the process control system 10 senses or computes the PNR time for each selection configuration parameter still available. The PNR time for a particular configuration parameter can change over the course of the production process. This may be due, by way of example, to changing inventories, internal changes in the process cycle, or alternatively change requests from the customer that have been taken into consideration beforehand.

In a step 103, a test is then performed to determine whether or not the transmission of the production data record is meant to take place automatically. This has been prescribed beforehand by the user. If so, the production data record is transmitted to the work server 42 in a step 104. This step 104 furthermore involves communication data associated with the production data record being transmitted to the work server 42, which communication data define a communication partner to which the production data record is then intended to be transmitted from the work server 42 to an electronic device 32. After step 104, the sequence begins afresh in step 101.

The communication data can also provide a stipulation about the type of communication and the communication path. As such, a user can be informed, for example via email or SMS, that a change of configuration parameters is possible. The user can then perform this using the relevant computer program. On the other hand, the communication can also take place directly via the computer program.

If the transmission is not meant to take place automatically, then it is ascertained in a step 105 whether a request for retrieval of the production data record has been received. If this is not the case, the sequence begins afresh with step 101. If there is a request for retrieval of the production data record, step 104 is performed, following the performance of which the sequence begins afresh with step 101.

A process 200 is executed in parallel, said process involving a test being performed in a step 201 to determine whether a change data record has been received from the communication partner indicating a change of the configuration of the motor vehicle 28 to be manufactured to the process control system 10.

While a change data record has not been received, step 201 is performed in parallel with the program 100 in a loop. If a change data record has been received, then the production process is recoordinated in a step 202, with the desired changes being taken into account.

After the recoordination of the production process has taken place, the program sequence 100 is performed again beginning with step 101.

Figure 3:
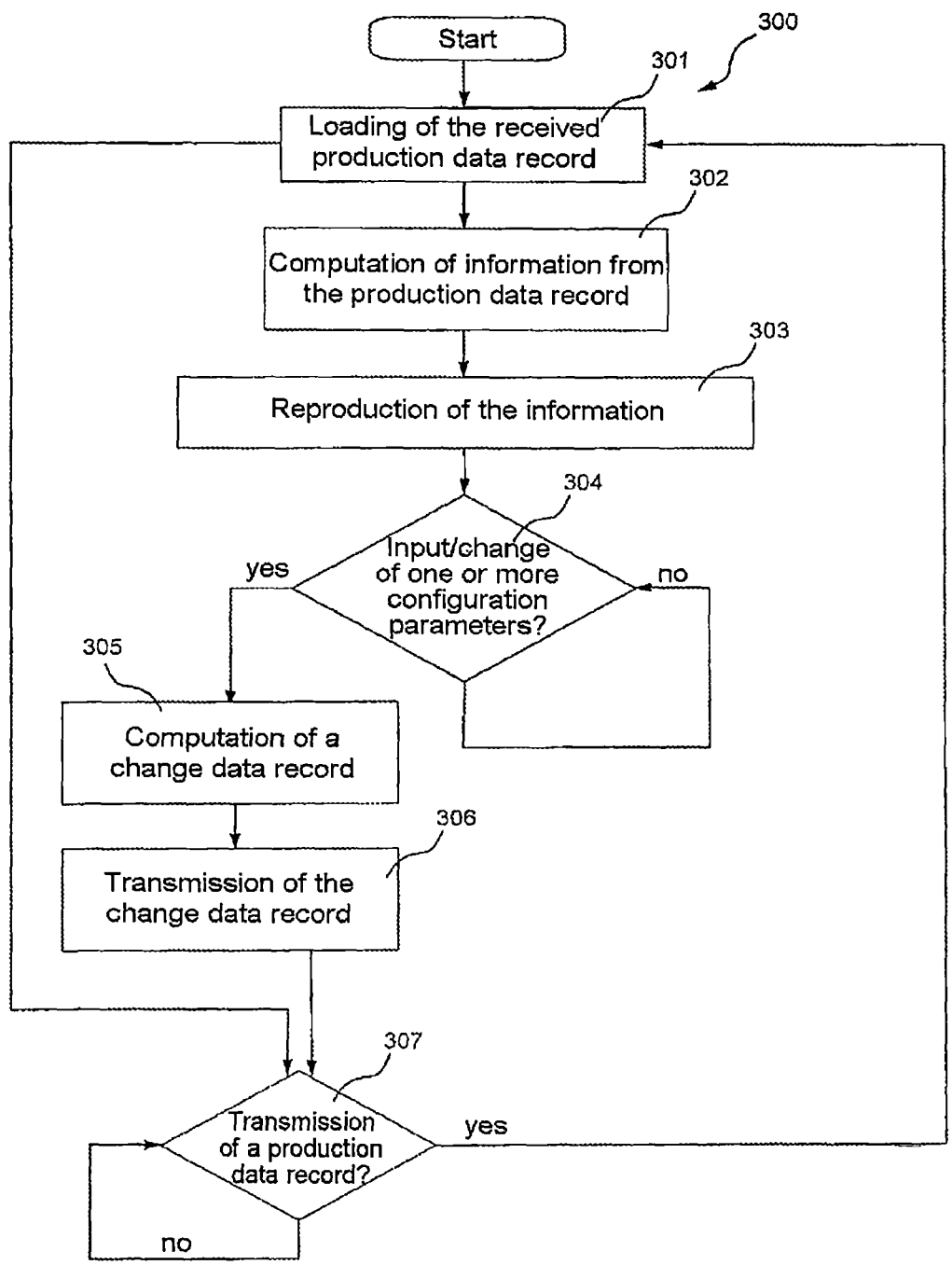
FIG. 3 shows a flowchart that illustrates the essential aspects of the data and communication processing of an electronic communication device.

FIG. 3 now uses an exemplary embodiment to illustrate the essential aspects of the communication and data processing of the computer program that is installed on the communication device 32. In this case, it is assumed that step 104 in the process 100 of the process control system 10 has been performed and a production data record has been transmitted to the communication device 32. In this case too, it goes without saying that the communication and data processing also include further tests and/or implementation steps that are not shown specifically in this case.

The computer program then executes a process 300. Said process involves the production data record received being loaded in a step 301. This is followed by a step 302, in which the production data record is taken as a basis for computing the information contained therein. This information is then reproduced in usable form in a step 303, as has been explained above.

In a step 304, a test is performed in a loop to determine whether an input and consequently a change is made or has been made for the configuration parameters. If so, the input and the change made are taken as a basis for computing a change data record in a step 305. There are various approaches for this. By way of example, the whole production data record received can be modified. Alternatively, it is also possible for only the specifically input parameter to be contained as information in the change data record. The alteration in comparison with the parameter originally contained in the production data record can then be ascertained by the process control system 10 by virtue of the data records being correlated to one another.

The change data record generated is then transmitted to the communication partner in a step 306. Thereafter, a test is performed in a step 307 to determine whether a production data record has been transmitted. This test takes place in parallel with the described operations in a loop, even if a transmitted production data record is worked on. If a new production data record has been transmitted, the process 300 is performed again beginning with step 301.

Overall, an electronic data processing system is formed with at least one computer on which a computer program as explained above is installed.

Data storage media are made available that have such a computer program stored on them.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

I claim:

1. A method for producing objects in an industrial production process, the method comprising the steps of:
    coordinating a multiplicity of workflows using a process control system to produce an object,
    using a communication path to bidirectionally interchange data between the process control system and at least one electronic communication device that is operated separately and independently from the process control system,
    inputting data on the at least one electronic communication device to select at least one configuration parameter for the object being produced,
    transmitting the data to the process control system as a change data record, and the process control system intervenes in a production process to produce the object on the basis of the change data record obtained,
    wherein the data may be input to change the at least one configuration parameter and the production process re-coordinated after production of the object has begun, and the production process is changed so that the object resulting from the production process includes the at least one configuration parameter when the production process is completed,
    wherein the production process comprises a multiplicity of workflows firmly defined in the ongoing production process and at least one configuration workflow that is used to implement the at least one configuration parameter on the object, wherein the at least one configuration workflow can be modified, replaced, added or omitted until a point of no return ("PNR") time associated with the at least one configuration parameter is reached when the at least one-configuration parameter changes before the at least one configuration parameter's PNR time is reached, wherein the at least one configuration parameter defines a changeable selection configuration parameter which can be changed during the production process for production of the object before the PNR time is reached and, when the PNR time is reached, becomes an unalterable fixed configuration parameter of the object;
    wherein
    a) a production data record is generated that reflects at least one available selection configuration parameter;
    b) the production data record is transmitted to the at least one electronic communication device automatically or on request;

c) the production data record is reproduced and the at least one selection configuration parameter is changed by a user;
d) the change data record reflects changes of the at least one selection configuration parameter, and
e) the production data record reflects the PNR time for an available selection configuration parameter for the object being produced.

2. The method as claimed in claim 1, wherein the production data record reflects multiple available selection configuration parameters for the object being produced, and at least one of the selection configuration parameters is changed by the user.

3. The method as claimed in claim 1, wherein the production data record reflects a production status and/or available fixed configuration parameters for the object being produced.

4. The method as claimed in claim 1, wherein the production data record reflects information about selection options for an available selection configuration parameter for the object being produced.

5. The method as claimed in claim 1, wherein at least one selection-configuration parameter is an individual configuration parameter that the user can use to individualize the object being produced.

* * * * *